(12) United States Patent
Klei et al.

(10) Patent No.: US 7,750,067 B2
(45) Date of Patent: Jul. 6, 2010

(54) BLACK-COLORED POLY(ARYLENE ETHER)POLYSTYRENE COMPOSITIONS, ARTICLES, AND METHODS

(75) Inventors: Steven Raymond Klei, Guilderland, NY (US); Juha-Matti Levasalmi, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 623 days.

(21) Appl. No.: 11/784,062

(22) Filed: Apr. 5, 2007

(65) Prior Publication Data

US 2008/0245270 A1 Oct. 9, 2008

(51) Int. Cl.
C08L 9/06 (2006.01)
(52) U.S. Cl. ............... 524/80; 523/1; 106/287.2; 106/287.23; 106/287.25
(58) Field of Classification Search ............ 524/80; 523/1; 106/287.2, 287.23, 287.25
See application file for complete search history.

(56) References Cited

U.S. PATENT DOCUMENTS

| 4,493,915 | A | 1/1985 | Lohmeijer |
| 6,355,723 | B1 | 3/2002 | van Baal et al. |
| 6,822,041 | B2 | 11/2004 | Schottland et al. |
| 6,833,184 | B2 | 12/2004 | Damnjanovic et al. |
| 7,157,129 | B2 | 1/2007 | Pai-Paranjape et al. |
| 2002/0002225 | A1 | 1/2002 | Reil |
| 2006/0068317 | A1* | 3/2006 | Klei et al. ............ 430/270.1 |
| 2006/0131059 | A1 | 6/2006 | Xu et al. |
| 2006/0247338 | A1 | 11/2006 | Klei et al. |

FOREIGN PATENT DOCUMENTS

| EP | 0542536 A1 | 5/1993 |
| WO | 2008106363 A2 | 9/2008 |

OTHER PUBLICATIONS

International Search Report; International Application No. PCT/US2008/059251; International Filing Date Mar. 4, 2008; Date of Mailing Nov. 3, 2009; 6 pages.
Written Opinion of the International Searching Authority; International Application No. PCT/US2008/059251; International Filing Date Mar. 4, 2008; 5 pages.
U.S. Appl. No. 11/758,935, filed Jun. 6, 2007 Available in the Image File Wrapper on the USPTO website.
ASTM D542-00 (Reapproved 2006) Standard Test Method for Index of Refraction of Transparent Organic Plastics (4 pages).
ASTM D3037-93 Standard Test Methods for Carbon Black-Surface Area by Nitrogen Adsorption (13 pages).
ASTM D3265-07 Standard Test Method for Carbon Black-Tint Strength (5 pages).
ASTM D2414-06a Standard Test Method for Carbon Black-Oil Absorption No. (OAN) (7 pages).
ASTM D256-06a Standard Test Methods for Determining the Izod Pendulum Impact Resistance of Plastics (20 pages).
ASTM D638-03 Standard Test Method for Tensile Properties of Plastics (15 pages).
ASTM D648-06 Standard Test Method for Deflection Temperature of Plastics Under Flexural Load in the Edgewise Position (13 pages).
ASTM D2244-02 Standard Practice for Calculation of Color Tolerances and Color Differences from Instrumentally Measured Color Coordinates (10 pages).
ASTM D523-89 (Reapproved 1999) Standard Test Method for Specular Gloss (5 pages).
P.F. Rankin in H. Zweifel ed. Plastic Additives Handbook, $5^{th}$ edition, Cincinnati: Hanser 2001, pp. 681-698.
SAE J1885 Surface Vehicle Standard, "Accelerated Exposure of Automotive Interior Trim Components Using a Controlled Irradiance Water Cooled Xenon-Arc Apparatus", Rev. Mar. 2005 (21 pages).
Macrolex Brochure by Lanxess, Soluble Dyes for Plastics, Edition: Oct. 2004 (7 pages).
GretagMacbeth Color-Eye® 740 Series, Quick Operation Manual, Issued Jun. 1997 (4 pages).
JIS K 5600-5-4: 1999 Standard for Pencil Hardness Testing (ISO/DIS 15184: 1996) (13 pages).
EP1029650 B1; Feb. 17, 2000; Human Translation (4 pages).
JP 2005132970; Mar. 26, 2005; Machine Translation; 28 pages.

* cited by examiner

*Primary Examiner*—Kriellion A Sanders
(74) *Attorney, Agent, or Firm*—Cantor Colburn LLP (57) ABSTRACT

A black-colored plastic composition includes a poly(arylene ether), a polystyrene, and at least two organic dyes. The composition has a high gloss and a deep black color that is unexpectedly much more light stable that a comparable black-color plastic using a carbon black pigment. The composition is useful in the manufacture of automotive interiors, and electronic equipment including consumer electronics and particularly television bezels.

40 Claims, 1 Drawing Sheet
(1 of 1 Drawing Sheet(s) Filed in Color)

Figure 1

BLACK-COLORED POLY(ARYLENE ETHER)POLYSTYRENE COMPOSITIONS, ARTICLES, AND METHODS

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of products, for example, plumbing fixtures, electrical boxes, automotive parts, and parts for consumer electronics devices.

Many consumer product manufacturers seek to improve the aesthetics and distinctiveness of their products by using new colors in the plastic components of their products. For example, in the area of television displays there has recently been a desire for plastic formulations having a high gloss and deep bluish black ("jet black") color. The physical, thermal, and electrical properties of poly(arylene ether)/polystyrene blends would make them good candidates for these uses, and formulations using pigments such as carbon black have allowed the formulation of black-colored poly(arylene ether)/polystyrene blends. However, these blends did not exhibit the desired deep bluish black initial color, nor did they exhibit sufficient light stability. There therefore remains a need for thermoplastic formulations that exhibit the desirable physical, thermal, and electrical properties of poly(arylene ether)/polystyrene blends and further exhibit a deep bluish black color with good light stability.

BRIEF DESCRIPTION OF THE INVENTION

The above-described and other drawbacks are alleviated by a black-colored thermoplastic composition, comprising: a poly(arylene ether), a polystyrene, and at least two organic dyes; wherein the total concentration of the at least two organic dyes is at least 0.4 weight percent, based on the total weight of the thermoplastic composition; wherein the composition exhibits a 60° gloss value of at least 90 percent measured according to ASTM D523, and a CIE lightness value, L*, less than or equal to 4 measured according to ASTM D2244 at an angle of 45° with the specular component of light excluded and using the CIE standard daylight illuminant D65, wherein the CIE lightness value is at least 30 percent lower than a CIE lightness value of a corresponding composition in which an equal weight of carbon black has been substituted for the at least two organic dyes.

Another embodiment is a black-colored thermoplastic composition, comprising: about 30 to about 65 weight percent of a poly(2,6-dimethyl-1,4-phenylene ether) having an intrinsic viscosity of 0.35 to 0.5 deciliter per gram measured at 25° C. in chloroform; about 15 to about 70 weight percent of a rubber-modified polystyrene; and at least 0.4 weight percent total of at least four organic dyes, wherein the at least four organic dyes comprise a red dye, a green dye, a yellow dye, and a violet dye; wherein all weight percents are based on the total weight of the thermoplastic composition; and wherein the composition exhibits a 60° gloss value of at least 94 percent, measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, $\Delta E$, less than or equal to 2 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter, measured according to ASTM D256 at 23° C., and a modulus of elasticity of about 2400 to about 3700 megapascals measured according to ASTM D638 at 23° C.

Another embodiment is a black-colored thermoplastic composition, comprising: about 40 to about 70 weight percent of a poly(2,6-dimethyl-1,4-phenylene ether) having an intrinsic viscosity of 0.28 to 0.38 deciliter per gram measured at 25° C. in chloroform; about 15 to about 45 weight percent of a rubber-modified polystyrene; and at least 0.4 weight percent of at least four organic dyes, wherein the at least four organic dyes comprise a red dye, a green dye, a yellow dye, and a violet dye; wherein all weight percents are based on the total weight of the thermoplastic composition; and wherein the composition exhibits a 600 gloss value of at least 94 percent measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, $\Delta E$, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter measured according to ASTM D256 at 23° C., and a modulus of elasticity of about 2400 to about 3700 megapascals measured according to ASTM D638 at 23° C.

Another embodiment is a method of preparing a black-colored thermoplastic composition, comprising: melt-kneading a composition comprising a poly(arylene ether), a polystyrene, and at least two organic dyes to form a black-colored thermoplastic composition; wherein the total concentration of the at least two organic dyes is at least 0.4 weight percent, based on the total weight of the black-colored thermoplastic composition; and wherein the black-colored thermoplastic composition exhibits a 600 gloss value of at least 90 percent measured according to ASTM D523, and a CIE lightness value, L*, less than or equal to 4 measured according to ASTM D2244 at an angle of 45° with the specular component of light excluded and using the CIE standard daylight illuminant D65, wherein the CIE lightness value is at least 30 percent lower than a CIE lightness value of a corresponding composition in which an equal weight of carbon black has been substituted for the at least two organic dyes.

Another embodiment is a method of preparing a black-colored thermoplastic composition, comprising: melt-kneading a composition comprising about 30 to about 50 weight percent of a poly(2,6-dimethyl-1,4-phenylene ether) having an intrinsic viscosity of 0.35 to 0.5 deciliter per gram measured at 25° C. in chloroform, about 15 to about 70 weight percent of a rubber-modified polystyrene, and at least 0.4 weight percent total of at least four organic dyes, wherein the at least four organic dyes comprise a red dye, a green dye, a yellow dye, and a violet dye to form a black-colored thermoplastic composition; wherein all weight percents are based on the total weight of the black-colored thermoplastic composition; and wherein the black-colored thermoplastic composition exhibits a 600 gloss value of at least 94 percent, measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, ΔE, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter, measured according to ASTM D256 at 23° C., and a modulus of elasticity of at about 2400 to about 3700 megapascals measured according to ASTM D638 at 23° C.

Another embodiment is a method of preparing a black-colored thermoplastic composition, comprising: melt-kneading a composition comprising about 40 to about 60 weight percent of a poly(2,6-dimethyl-1,4-phenylene ether) having an intrinsic viscosity of 0.28 to 0.38 deciliter per gram measured at 25° C. in chloroform, about 15 to about 45 weight percent of a rubber-modified polystyrene, and at least 0.4 weight percent of at least four organic dyes, wherein the at least four organic dyes comprise a red dye, a green dye, a yellow dye, and a violet dye to form a black-colored thermoplastic composition; wherein all weight percents are based on the total weight of the black-colored thermoplastic composition; and wherein the black-colored thermoplastic composition exhibits a 60° gloss value of at least 94 percent measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, ΔE, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter measured according to ASTM D256 at 23° C., and a modulus of elasticity of at about 2400 to about 3700 megapascals measured according to ASTM D638 at 23° C.

Other embodiments, including articles comprising the compositions, are described in detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present inventors conducted research to find a poly (arylene ether)/polystyrene blend that would preserve the excellent physical, thermal, and electrical properties of such blends and further exhibit a deep bluish black color with good light stability. Initial experiments confirmed that this combination of properties could not be obtained using pigments such as carbon black. For example, the initial color of carbon black-containing blends was not sufficiently dark, and the light stability was inadequate for use in applications where there is daylight exposure. It was also conventional wisdom that dye-based black formulations would be less light-stable than pigment-based black formulations. For example, U.S. Pat. No. 6,833,184 B2 to Damnjanovic et al. refers to the "outstanding light stability" of window films pigmented with carbon black and also states that dye-based films exhibit "relatively short life expectance" because the "organic dyes tend to degrade after exposure to sunlight". The present inventors were therefore very surprised to discover that poly (arylene ether)/polystyrene compositions colored with organic dyes not only provided the desired high-gloss, but also exhibited substantially deeper blacks and markedly improved light stability compared to corresponding compositions colored with carbon black.

Thus, one embodiment is a black-colored thermoplastic composition, comprising: a poly(arylene ether), a polystyrene, and at least two organic dyes; wherein the total concentration of the at least two organic dyes is at least 0.4 weight percent, based on the total weight of the thermoplastic composition; wherein the composition exhibits a 60° gloss value of at least 90 percent measured according to ASTM D523, and a CIE lightness value, L*, less than or equal to 4 measured according to ASTM D2244 at an angle of 45° with the specular component of light excluded and using the CIE standard daylight illuminant D65, wherein the CIE lightness value is at least 30 percent lower than a CIE lightness value of a corresponding composition in which an equal weight of carbon black has been substituted for the at least two organic dyes.

The black-colored thermoplastic composition comprises a poly(arylene ether). Suitable poly(arylene ether)s include those comprising repeating structural units having the formula wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio (that is, ($C_1$-$C_{12}$ hydrocarbyl)S—), $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In some embodiments, the poly(arylene ether) comprises 2,6-dimethyl-1,4-phenylene ether units, 2,3,6-trimethyl-1,4-phenylene ether units, or a combination thereof. The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) can have a number average molecular weight of about 3,000 to about 40,000 atomic mass units (AMU) and a weight average molecular weight of about 5,000 to about 80,000 AMU, as determined by gel permeation chromatography using monodisperse polystyrene standards, a styrene divinyl benzene gel at 40° C. and samples having a concentration of 1 milligram per milliliter of chloroform. The poly(arylene ether) can have an intrinsic viscosity of about 0.05 to about 1.0 deciliter per gram (dL/g), as measured in chloroform at 25° C., specifically about 0.1 to about 0.8 dL/g, more specifically about 0.2 to about 0.6 dL/g. In some embodiments, the poly(arylene ether) has an intrinsic viscosity of about 0.28 to 0.38 dL/g. In some embodiments, the poly(arylene ether) has an intrinsic viscosity of about 0.35 to about 0.45 dL/g. Those skilled in the art understand that intrinsic viscosity of a poly(arylene ether) can increase by up to 30% on melt kneading. The above intrinsic viscosity range of 0.05 to about 1.0 deciliter per gram is intended to encompass intrinsic viscosities both before and after melt kneading to form the composition. A blend of poly(arylene ether) resins having different intrinsic viscosities can be used.

The poly(arylene ether) content of the black-colored thermoplastic composition can vary widely depending on the desired properties of the composition. In some embodiments, the poly(arylene ether) content is about 10 to about 90 weight percent, specifically about 20 to about 80 weight percent, more specifically about 25 to about 75 weight percent, still more specifically about 30 to about 70 weight percent, even more specifically about 35 to about 65 weight percent, yet more specifically about 40 to about 60 weight percent, based on the total weight of the composition.

In addition to the poly(arylene ether), the black-colored thermoplastic composition comprises a polystyrene. Suitable polystyrenes include homopolystyrenes (including atactic, syndiotactic, and isotactic polystyrenes) and rubber-modified polystyrenes (also known as "high-impact polystyrenes" or "HIPS"). In some embodiments, the polystyrene comprises a homopolystyrene having a number average molecular weight of about 30,000 to about 100,000 atomic mass units, specifically abut 40,000 to about 60,000 atomic mass units. Suitable homopolystyrenes are commercially available as, for example EB3300 from Chevron. In some embodiments, the polystyrene comprises a rubber-modified polystyrene comprising about 88 to about 94 weight percent polystyrene and about 6 to about 12 weight percent polybutadiene, with an effective gel content of about 10% to about 35%. Suitable rubber-modified polystyrenes are commercially available as, for example, GEH 1897 from GE Plastics, and D7022.27 from Chevron. In some embodiments, the polystyrene comprises a homopolystyrene and a rubber-modified polystyrene.

The polystyrene content of the black-colored thermoplastic composition can vary widely depending on the desired properties of the composition. In some embodiments, the polystyrene content is about 10 to about 90 weight percent, specifically about 15 to about 80 weight percent, more specifically about 20 to about 70 weight percent, still more specifically about 25 to about 60 weight percent, even more specifically about 30 to about 50 weight percent, yet more specifically about 35 to about 45 weight percent, based on the total weight of the composition.

In some embodiments, the black-colored thermoplastic composition comprises about 20 to about 80 weight percent of the poly(arylene ether) and about 20 to about 80 weight percent of the polystyrene, specifically about 30 to about 70 weight percent of the poly(arylene ether) and about 30 to about 70 weight percent of the polystyrene, more specifically about 35 to about 65 weight percent of the poly(arylene ether) and about 35 to about 65 weight percent of the polystyrene.

In addition to the poly(arylene ether) and the polystyrene, the black-colored thermoplastic composition comprises at least two organic dyes. The at least two organic dyes are selected to provide a desired black color. Suitable dye classes from which the at least two organic dyes can be selected include anthraquinones, anthrapyridones, perylenes, anthracenes, perinones, indanthrones, quinacridones, xanthenes, thioxanthenes, oxazines, oxazolines, indigoids, thioindigoids, quinophthalones, naphthalimides, cyanines, methines, pyrazolones, lactones, coumarins, bis-benzoxazolylthiophenes, naphthalenetetracarboxylic acids, phthalocyanines, triarylmethanes, aminoketones, bis(styryl)biphenyls, azines, rhodamines, derivatives of the foregoing, and mixtures thereof.

Specific organic dyes suitable for use among the at least two organic dyes include Disperse Yellow 201, Solvent Green 3, Solvent Red 52, Solvent Red 135, Solvent Violet 13, Disperse Orange 47, Solvent Orange 60, and Solvent Blue 104.

Figure 1:
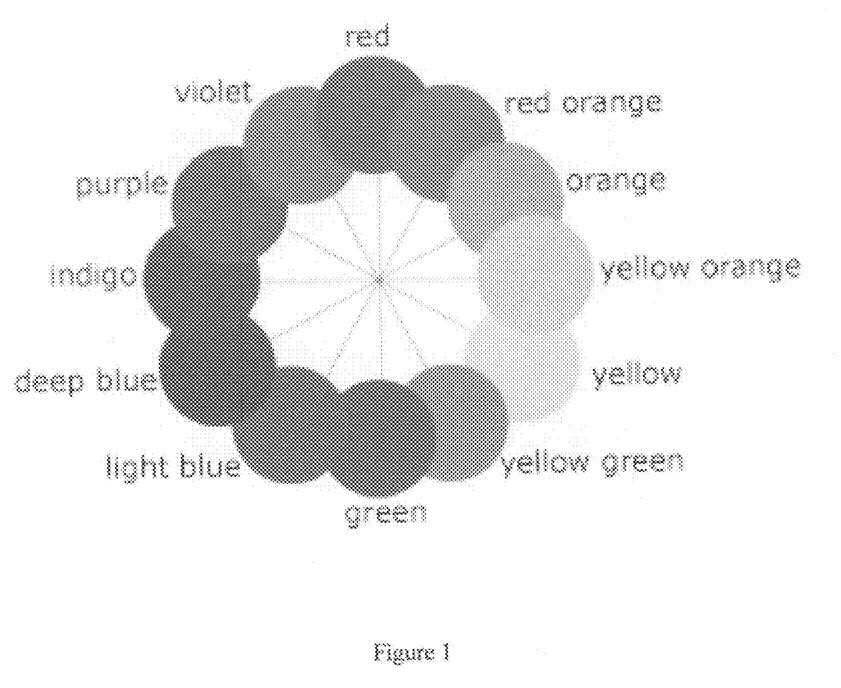
FIG. 1 is a color wheel intended to illustrate the selection of dyes corresponding to colors from opposites sides of the color wheel.

It is possible to produce a black color using only two dyes, particularly when they are dyes from opposite sides of the color wheel illustrated in FIG. 1. For example, the at least two organic dyes can comprise a red dye and a green dye, or a violet dye and a yellow dye, or an orange dye and a blue dye. However, in some embodiments it is desirable to use at least three organic dyes. For example, the use of at least three dyes provides greater opportunities for adjusting color as needed in process of manufacturing the black-colored composition. In some embodiments, two or three such dye combination may be used. Thus, the composition can comprise at least two dye combinations selected from a red dye and a green dye, a violet dye and a yellow dye, and an orange dye and a blue dye.

In some embodiments, the at least two organic dyes comprise at least one dye combination selected from the group consisting of a solvent red dye and a solvent green dye, a solvent violet dye and a solvent yellow dye or disperse yellow dye, and a solvent orange dye and a solvent blue dye. The at least two organic dyes can comprise at least two of the dye combinations, or at least three such dye combinations.

The total concentration of the at least two organic dyes is at least 0.4 weight percent, based on the total weight of the thermoplastic composition. Those skilled in the art can select relative amounts of particular dyes. For example, when the at least two organic dyes comprise two dyes from opposite sides of the color wheel, the weight ratio of the two dyes can be about 0.5 to 2, specifically about 0.7 to about 1.5.

The composition exhibits a 60° gloss value of at least 90 percent, measured according to ASTM D523. The 60° gloss value may be at least 94 percent, specifically at least 97 percent, more specifically at least 100 percent. In some embodiments, the 60° gloss value is 90 to about 105 percent.

The composition exhibits a CIE lightness value, L*, less than or equal to 4 measured according to ASTM D2244 at an angle of 45° with the specular component of light excluded and using the CIE standard daylight illuminant D65. Specifically, the L* value may be less than or equal to 3, more specifically less than or equal to 1.5, still more specifically less than or equal to 1. In some embodiments, the L* value is about 0.5 to 4. All references herein to CIE parameters are based on the CIE 1976 L*a*b* (CIELAB) color space equations.

The CIE lightness value of the composition is at least 30 percent lower than a CIE lightness value of a corresponding composition in which an equal weight of carbon black has been substituted for the at least two organic dyes. In some embodiments, the reduction in CIE lightness value is at least 40 percent, more specifically at least 50 percent, still more specifically at least 60 percent, even more specifically at least 70 percent, yet more specifically at least 80 percent. In some embodiments, the CIE lightness value reduction is 30 to about 95 percent. A carbon black that is suitable for use in the comparison composition can have a dibutyl phthalate absorption of 60 and 80 milliliters per 100 grams measured according to ASTM D2414, a nitrogen surface area of about 190 to about 220 square-meters per gram measured according to ASTM D3037, and a tint strength of about 136 to about 160 measured according to ASTM D3265. Two commercially available carbon blacks satisfying these criteria are Cabot Monarch 800 from Cabot and Raven 2000 from Columbian.

Although the use of organic dyes provides benefits relative to the use of carbon black, small amounts of carbon black are not necessarily excluded from the composition. In some embodiments, the composition comprises up to 0.1 weight percent of carbon black, specifically up to 0.05 weight percent of carbon black, more specifically up to 0.01 weight percent of carbon black. In some embodiments, the composition is free of carbon black.

In addition to the poly(arylene ether), the polystyrene, the black-colored thermoplastic composition can, optionally, further comprise a block copolymer of an alkenyl aromatic compound and a conjugated diene. For brevity, this component is referred to herein as the "block copolymer". The block copolymer can be unhydrogenated or hydrogenated. The block copolymer may comprise about 15 to about 80 weight percent of poly(alkenyl aromatic) content and about 20 to about 85 weight percent of unhydrogenated or hydrogenated poly(conjugated diene) content. In some embodiments, the poly(alkenyl aromatic) content is about 20 to 40 weight percent. In other embodiments, the poly(alkenyl aromatic) content is greater than 40 weight percent to about 90 weight percent, specifically about 55 to about 80 weight percent.

In some embodiments, the block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the block copolymer has a weight average molecular weight of 200,000 to about 400,000 atomic mass units, specifically about 220,000 to about 350,000 atomic mass units. In other embodiments, the block copolymer has a weight average molecular weight of about 40,000 to less than 200,000 atomic mass units, specifically about 40,000 to about 180,000 atomic mass units, more specifically about 40,000 to about 150,000 atomic mass units.

The alkenyl aromatic monomer used to prepare the block copolymer can have the structure wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

The conjugated diene used to prepare the block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The block copolymer is a copolymer comprising (A) at least one block derived from an alkenyl aromatic compound and (B) at least one block derived from a conjugated diene. When the block copolymer is a hydrogenated block copolymer, the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the block copolymer has a tapered linear structure. In some embodiments, the block copolymer has a non-tapered linear structure. In some embodiments, the block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the block copolymer is a diblock copolymer, a triblock copolymer, or a combination thereof. In some embodiments, the block copolymer is a polystyrene-poly(ethylene-butylene)-polystyrene triblock copolymer (that is, a hydrogenated polystyrene-polybutadiene-polystyrene triblock copolymer).

In some embodiments, the block copolymer excludes the residue of monomers other than the alkenyl aromatic compound and the conjugated diene. In these embodiments, the block copolymer consists of blocks derived from the alkenyl aromatic compound and the conjugated diene, and it does not comprise grafts formed from these or any other monomers; it also consists of carbon and hydrogen atoms and therefore excludes heteroatoms.

In some embodiments, the block copolymer includes the residue of one or more acid functionalizing agents, such as maleic anhydride.

Methods of preparing block copolymers are known in the art and many hydrogenated block copolymers are commercially available. Illustrative commercially available unhydrogenated block copolymers include the polystyrene-polybutadiene-polystyrene triblock copolymers available from Kraton Polymers as Kraton D1101K, D1102K, D1118K, D1133K, D1134K, D1153ES, D1155ES, and D1192ES; the radial triblock copolymer available from Kraton Polymers as D1116K; the branched triblock copolymer available from Kraton Polymers as D1184K; and the tapered block copolymers available from Total Petrochemicals as FINACLEAR® 520 and 540. Illustrative commercially available hydrogenated block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more block copolymers may be used, including mixtures of at least two hydrogenated block copolymers, and mixtures of at least one unhydrogenated block copolymer and at least one hydrogenated block copolymer.

When present, the block copolymer may be used in an amount of about 0.5 to about 20 weight percent, specifically about 1 to about 10 weight percent, more specifically about 1 to about 5 weight percent, based on the total weight of the composition.

The composition can, optionally, further comprise a flame retardant. Suitable flame retardants include, for example, phosphate esters (including triethyl phosphate, triphenyl phosphate, resorcinol bis(diphenyl phosphate), and bisphenol A bis(diphenyl phosphate)), phosphine oxides (including triphenyl phosphine oxide), alkyl phosphonates, (including ethanephosphonic acid diethyl ester), metal dialkyl phosphinates (including aluminum tris(diethyl phosphinate), melamine type flame retardants (including melamine, melamine cyanurate, melamine phosphate, melamine pyrophosphate, and melamine polyphosphate), zinc borate, boron phosphate, red phosphorus, and the like. Additional flame retardants are described, for example, in U.S. Patent Application Publication No. US 2006/0131059 A1 of Xu et al.; and P. F. Rankin in H. Zweifel, ed., "Plastics Additives Handbook, 5th Edition", Cincinnati: Hanser (2001), pages 681-698.

The composition can, optionally, further comprise one or more other additives known in the thermoplastics arts. Useful additives include, for example, stabilizers, mold release agents, processing aids, drip retardants, nucleating agents, dyes, pigments, antioxidants, anti-static agents, blowing agents, metal deactivators, antiblocking agents, nanoclays, fragrances (including fragrance-encapsulated polymers), and the like, and combinations thereof. Additives can be added in amounts that do not unacceptably detract from the desired performance and physical properties of the composition. Such amounts can be determined by a skilled artisan without undue experimentation.

In some embodiments, the composition is free of inorganic fillers and reinforcing agents.

In other embodiments, the composition comprises one or more inorganic fillers. Suitable fillers and reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; and mixtures thereof.

In some embodiments, the composition is free of any polymer other than the poly(arylene ether), the polystyrene, and the optional block copolymer. For example, in some embodiments, the composition is free of polycarbonate.

In some embodiments, the composition is free of any polymer having a refractive index less than 1.54 or greater than 1.62, specifically less than 1.56 or greater than 1.60, measured according to ASTM D542 at 23° C.

In some embodiments, the composition exhibits a CIELAB color shift, ΔE, less than or equal to 3 measured according to ASTM D2244 after 600 hours xenon arc exposure according to SAE J1885. Specifically, the ΔE value can be less than or equal to 2, more specifically less than or equal to 1, still more specifically less than or equal to 0.5. In some embodiments, the ΔE value is about 0.3 to 3.

In addition to the highly desirable initial color and color stability, the black-colored thermoplastic composition can exhibit excellent thermal and physical properties. For example, the composition can exhibit a heat deflection temperature of at least 80° C. measured according to ASTM D648 at a load of 0.455 megapascals. Specifically, the composition can exhibit a heat deflection temperature of at least 90° C., more specifically at least 100° C., still more specifically at least 110° C. In some embodiments, the heat deflection temperature is 80 to about 125° C. The composition can exhibit a notched Izod impact strength of at least 20 Joules per meter (J/m) measured according to ASTM D256 at 23° C. Specifically, the notched Izod impact strength can be at least 50 J/m, more specifically at least 100 J/m, still more specifically at least 150 J/m, yet more specifically at least 200 J/m. In some embodiments, the notched Izod impact strength is 20 to about 220 J/m. The composition can exhibit a modulus of elasticity of at about 2400 to about 3700 megapascals measured according to ASTM D638 at 23° C.

In some embodiments the composition exhibits at least one of a flammability rating of V-0 measured according to the UL 94 Vertical Burning Test at a test sample thickness of 1.5 millimeters, a glow wire ignition temperature (GWIT) of about 700 to about 750° C. measured according to UL 746A at a test sample thickness of 1.0 millimeter, a glow wire ignition temperature (GWIT) of about 725 to about 775° C. measured according to UL 746A at a test sample thickness of 3.0 millimeters, and a glow wire flammability index (GWFI) of about 930 to about 990° C. measured according to UL 746A at a test sample thickness of 1.0 millimeter. The requirements for a UL9 94 V-0 rating include no individual burn times greater than 10 seconds, the combined first and second burn times for each bar are not greater then 10 seconds, and no ignition of cotton indicator by flaming particles or drips. The Glow-Wire Ignition Temperature (GWIT) is expressed as the temperature that is 25 K higher than the maximum temperature of the tip of the glow-wire which does not cause ignition of a test specimen of given thickness during three subsequent tests. The Glow-Wire Flammability Index (GWFI) is expressed as the highest test temperature, during three subsequent tests for a test specimen of a given thickness, at which at least one of the following conditions is fulfilled: (a) flames or glowing of the test specimen extinguish within 30 seconds after removal of the glow-wire and there is no ignition of the wrapping tissue placed underneath the test specimen; (b) there is no ignition of the test specimen.

One embodiment is a black-colored thermoplastic composition, comprising: about 30 to about 65 weight percent of a poly(2,6-dimethyl-1,4-phenylene ether) having an intrinsic viscosity of 0.35 to 0.5 deciliter per gram measured at 25° C. in chloroform; about 15 to about 70 weight percent of a rubber-modified polystyrene; and at least 0.4 weight percent total of at least four organic dyes, wherein the at least four organic dyes comprise a red dye, a green dye, a yellow dye, and a violet dye; wherein all weight percents are based on the total weight of the thermoplastic composition; and wherein the composition exhibits a 60° gloss value of at least 94 percent, measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, ΔE, less than or equal to 2 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter, measured according to ASTM D256 at 23° C., and a modulus of elasticity of at about 2400 to about 3700 megapascals measured according to ASTM D638 at 23° C. In some embodiments, the black-colored thermoplastic composition further comprises about 25 to about 45 weight percent of a homopolystyrene. In some embodiments, the at least four organic dyes further comprise a blue dye and an orange dye. In some embodiments, the composition further comprises a flame retardant. In some embodiments, the composition exhibits a CIE b* value of about −2.2 to about 0.

In some embodiments, the composition exhibits a pencil hardness of about HB to about 2H measured according to JIS K 56-5-4 at 23° C. under 750 gram load as follows. Molded color plaques of 5.1 centimeters (2 inches) in width and 7.6 centimeters (3 inches) in length are conditioned at 23° C. and 50% relative humidity for at least 16 hours. At the center of the test part, avoiding gate and edge areas, the flat tip of a pencil with a specified hardness level is run across a homogeneous, smooth surface for at least 7 millimeters in length at the speed of 0.5 to 1 millimeter per second. The run is performed three times, each time at a new, smooth location for a particular pencil hardness level with the edge of the pencil tip reconditioned to have a sharp edge after each run. A scratch is defined as a deformation of at least 3 millimeters in length detectable by human eye under ambient light conditions. The hardness of the pencil used in the test is increased by one step at a time until two out of three runs at a particular hardness level result in a scratch. The subsequent pencil hardness data within tables show test results for two separate test parts for each composition at a hardness test level that leads to no more than one scratch in three runs with the runs without a scratch receiving the hardness value of that particular test level and a run that leads to a scratch receiving the hardness value of the previous, softer pencil used for the test.

In some embodiments, the composition exhibits a 60° gloss value of 94 to 105 percent, a CIE lightness value, L*, of 0.5 to 2 wherein the CIE lightness value is 50 to 95 percent lower than a CIE lightness value of a corresponding composition in which an equal weight of carbon black has been substituted for the at least two organic dyes, a CIELAB color shift, ΔE, of 0.3 to 3, a heat deflection temperature of 80 to 120° C., and a notched Izod impact strength of 20 to 220 Joules per meter.

One embodiment is a black-colored thermoplastic composition, comprising: about 40 to about 70 weight percent of a poly(2,6-dimethyl-1,4-phenylene ether) having an intrinsic viscosity of 0.28 to 0.38 deciliter per gram measured at 25° C. in chloroform; about 15 to about 45 weight percent of a rubber-modified polystyrene; and at least 0.4 weight percent of at least four organic dyes, wherein the at least four organic dyes comprise a red dye, a green dye, a yellow dye, and a violet dye; wherein all weight percents are based on the total weight of the thermoplastic composition; and wherein the composition exhibits a 60° gloss value of at least 94 percent measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, ΔE, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter measured according to ASTM D256 at 23° C., and a modulus of elasticity of about 2400 to about 3700 megapascals measured according to ASTM D638 at 23° C. In some embodiments, the at least four organic dyes further comprise a blue dye and an orange dye. In some embodiments, the composition further comprises about 10 to about 30 weight percent of a homopolystyrene. In some embodiments, the composition further comprises a flame retardant. In some embodiments, wherein the composition exhibits a CIE b* value of about −2.2 to about 0. In some embodiments, the composition exhibits a pencil hardness of about HB to about 2H measured according to JIS K 56-5-4 at 23° C. In some embodiments, the composition exhibits a 60° gloss value of 94 to 105 percent, a CIE lightness value, L*, of 0.5 to 2 wherein the CIE lightness value is 50 to 95 percent lower than a CIE lightness value of a corresponding composition in which an equal weight of carbon black has been substituted for the at least two organic dyes, a CIELAB color shift, ΔE, of 0.3 to 3, a heat deflection temperature of 80 to 100° C., and a notched Izod impact strength of 20 to 100 Joules per meter.

One embodiment is a method of preparing a black-colored thermoplastic composition, comprising: melt-kneading a composition comprising a poly(arylene ether), a polystyrene, and at least two organic dyes to form a black-colored thermoplastic composition; wherein the total concentration of the at least two organic dyes is at least 0.4 weight percent, based on the total weight of the black-colored thermoplastic composition; and wherein the black-colored thermoplastic composition exhibits a 60° gloss value of at least 90 percent, measured according to ASTM D523, and a CIE lightness value, L*, less than or equal to 4 measured according to ASTM D2244 at an angle of 45° with the specular component of light excluded and using the CIE standard daylight illuminant D65, wherein the CIE lightness value is at least 30 percent lower than a CIE lightness value of a corresponding composition in which an equal weight of carbon black has been substituted for the at least two organic dyes. There is no particular limitation on the method of introduction of the at least two organic dyes. In some embodiments the at least two organic dyes are dry blended with other components before melt-kneading. In other embodiments, the at least two organic dyes are incorporated into a masterbatch that further comprises the poly (arylene ether) and/or the polystyrene and/or the block copolymer and/or another polymer.

One embodiment is a method of preparing a black-colored thermoplastic composition, comprising: melt-kneading a composition comprising about 30 to about 50 weight percent of a poly(2,6-dimethyl-1,4-phenylene ether) having an intrinsic viscosity of 0.35 to 0.5 deciliter per gram measured at 25° C. in chloroform, about 15 to about 70 weight percent of a rubber-modified polystyrene, and at least 0.4 weight percent total of at least four organic dyes, wherein the at least four organic dyes comprise a red dye, a green dye, a yellow dye, and a violet dye to form a black-colored thermoplastic composition; wherein all weight percents are based on the total weight of the black-colored thermoplastic composition; and wherein the black-colored thermoplastic composition exhibits a 60° gloss value of at least 94 percent, measured according to ASTM D523, a CIE lightness value, L*, less than or equal to 2 measured according to ASTM D2244 at an angle of 45° with the specular component of light excluded and using the CIE standard daylight illuminant D65 wherein the CIE lightness value is at least 50 percent lower than a CIE lightness value of a corresponding composition in which an equal weight of carbon black has been substituted for the at least two organic dyes, a CIELAB color shift, μE, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter, measured according to ASTM D256 at 23° C., and a modulus of elasticity of at about 2400 to about 3700 megapascals measured according to ASTM D638 at 23° C.

One embodiment is a method of preparing a black-colored thermoplastic composition, comprising: melt-kneading a composition comprising about 40 to about 60 weight percent of a poly(2,6-dimethyl-1,4-phenylene ether) having an intrinsic viscosity of 0.28 to 0.38 deciliter per gram measured at 25° C. in chloroform, about 15 to about 45 weight percent of a rubber-modified polystyrene, and at least 0.4 weight percent of at least four organic dyes, wherein the at least four organic dyes comprise a red dye, a green dye, a yellow dye, and a violet dye to form a black-colored thermoplastic composition; wherein all weight percents are based on the total weight of the black-colored thermoplastic composition; and wherein the black-colored thermoplastic composition exhibits a 60° gloss value of at least 94 percent measured according to ASTM D523, a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes, a CIELAB color shift, ΔE, less than or equal to 3 measured according to ASTM D2244 after 600 hours xenon arc exposure according to SAE J1885, a heat deflection temperature of at least 80° C. measured according to ASTM D648 at a load of 0.455 megapascals, a notched Izod impact strength of at least 20 Joules per meter measured according to ASTM D256 at 23° C., and a modulus of elasticity of at about 2400 to about 3700 megapascals measured according to ASTM D638 at 23° C.

Other embodiments include articles comprising any of the above-described black-colored thermoplastic compositions. Articles for which the compositions are particularly suitable include automotive interiors, and electronic equipment including consumer electronics and particularly television bezels.

The invention is further illustrated by the following non-limiting examples.

EXAMPLES 1-5, COMPARATIVE EXAMPLES 1-10

These examples illustrate the effects of colorant type (dyes versus carbon black) and mold release type (pentaerythritol tetrastearate versus linear low density polyethylene versus polydimethylsiloxane) on physical and optical properties. All of these compositions lack flame retardant.

Compositions are summarized in Table 1, with component amounts given in parts by weight. Comparative Examples 1 and 2 are replicates, as are Comparative Examples 4 and 5, and Comparative Examples 9 and 10. As used herein, the term "replicates" means that the compositions were separately dry-blended, extruded, and molded. A poly(2,6-dimethyl-1, 4-phenylene ether) having an intrinsic viscosity of 0.40 deciliter per gram measured at 25° C. in chloroform was obtained as PPO 640 from GE Plastics ("PPE, 0.4 dL/g" in Table 1). The antioxidant tridecyl phosphite was obtained as Doverphos 6 from Dover Chemical Company ("TDP" in Table 1). Pentaerythritol tetrastearate, used here as a mold release agent, was obtained as GlycoLube from Lonza ("PETS" in Table 1). A linear low density polyethylene, used here as a mold release agent, was obtained as LL5100.09 from ExxonMobil ("LLDPE" in Table 1). A polydimethylsiloxane having a number average molecular weight of about 10,000 atomic mass units, used here as a mold release agent, was obtained as Viscasil 10M from Momentive Performance Materials ("PDMSO" in Table 1). A high-gloss rubber-modified polystyrene (high-impact polystyrene) having a polystyrene content of 91.8 weight percent and a polybutadiene content of 8.2 weight percent was obtained as D7022.27 from Chevron ("HIPS"). Homopolystyrene having a number average molecular weight of about 52,000 atomic mass units was obtained as EB3300 from Chevron ("Homopolystyrene" in Table 1). Two functionally equivalent carbon blacks were obtained as Raven 2000 from Columbian having a surface area of 200 square-meters per gram and Monarch 800 from Cabot having a surface area of 210 square-meters per gram ("Carbon black" in Table 1). The yellow dye Disperse Yellow 201 was obtained as MACROLEX Yellow 6G from Lanxess ("Disperse Yellow 201" in Table 1). The green dye Solvent Green 3 was obtained as MACROLEX Green SB from Lanxess ("Solvent Green 3" in Table 1). The red dye Solvent Red 135 was obtained as MACROLEX Red EG from Lanxess ("Solvent Red 135" in Table 1). The violet dye Solvent Violet 13 was obtained as MACROLEX Violet B from Lanxess ("Solvent Violet 13" in Table 1).

All compositions were dry-blended, compounded, molded, and tested according to the following general procedure. All solid components are combined into a master blend and mixed using high-intensity blending equipment until homogeneous in color and content by visual check. The master blend is fed into the feed throat of a 30-millimeter twin-screw extruder with a length-to-diameter ratio of 32:1. Optionally, polystyrene based components that are in a pellet form can be fed into the feed throat through a separate feeder. For the compositions without flame retardant described here, the screw rotation rate is 300 rotations per minute (rpm), and the extruder temperature profile for zones from throat to die is set to 220-270-290-300-300-300° C. to give melt temperature in the 310 to 325° C. range. The pelletized extrudate is pre-dried at 60-70° C. for two hours. Molding equipment barrel and tool temperatures are set to 300° C. and 90° C., respectively. The molded color chips had dimensions 5.08 centimeters×7.62 centimeters×0.254 centimeter (2 inches×3 inches×0.100 inch).

Property results are summarized in Table 1. Pencil hardness was measured at 23° C. according to JIS K 56-5-4 (ISO/DIS 15184) with the test details described above ("Pencil hardness" in Table 1). Sixty degree gloss was measured according to ASTM D 523-89 (1999) using a GretagMacbeth COLOR-EYE 740 goniospectrophotometer. CIE lightness at 45 degrees was measured according to ASTM D2244-02, "Standard Practice for Calculation of Color Tolerances and Color Differences from Instrumentally Measured Color Coordinates" with the specular component of light excluded and using the CIE standard daylight illuminant D65 ("L* at 45 degrees" in Table 1). For some inventive examples, the improvement (reduction) in L* relative to a carbon black-containing comparison is calculated as a percentage according to the equation $$\text{percent improvement} = 100 \times (L^*_{CB} - L^*_{dye})/L^*_{CB}$$

wherein $L^*_{CB}$ is the CIE lightness at 45 degrees measured for the carbon black-containing composition, and $L^*_{dye}$ is the CIE lightness at 45 degrees measured for the dye-containing composition ("L* at 45 degrees, % improvement" in Table 1). Heat deflection temperature was measured according to ASTM D648-06, Method B, using a load of 0.455 megapascals and injection molded specimens having a width of 3.20 millimeters and a depth of 12.80 millimeters ("HDT (° C.)" in Table 1). Notched Izod impact strength was measured according to ASTM D 256-06 Method A at 23° C. using a 0.907 kilogram (2.00 pound) hammer, and specimens having a notch such that at least 1.02 centimeter (0.4 inch) of the original 1.27 centimeter (0.5 inch) depth remained under the notch ("Impact strength (J/m)" in Table 1). Modulus of elasticity was measured according to ASTM D638-08 at 23° C. using a Type I tensile bar and a test speed of 50 millimeters per minute ("Modulus of elasticity (MPa)" in Table 1).

The first part of Table 1 features compositions in which the polystyrene is a homopolystyrene. Comparing the results for Example 1 and Comparative Examples 1 and 2 (which are replicates) shows that the dye-containing composition of Example 1 exhibits a dramatically lower value of L* at 45° compared to the carbon black-containing composition of Comparative Examples 1 and 2. In particular, the value of L* at 45° is decreased about 77% for the dye-containing composition versus the carbon black-containing composition. Example 1 also exhibits improved 60° gloss and modulus of elasticity. Comparative Example 3 uses a silicone oil mold release agent but is otherwise similar to Comparative Examples 1 and 2. Note that the L*, gloss, and modulus values of Comparative Example 3 are all inferior to those for Example 1. Example 2 and Comparative Examples 4 and 5 (which are replicates) all use a pentaerythritol tetrastearate mold release agent, but Example 2 uses dyes while Comparative Examples 4 and 5 use carbon black. Example 2 exhibits dramatically a reduced (64% reduced) L* value versus Comparative Examples 4 and 5. Example 2 also exhibits improved 60° gloss and modulus of elasticity.

The continuation of Table 1 features compositions in which the polystyrene is a rubber-modified polystyrene or a mixture of homopolystyrene and rubber-modified polystyrene. Example 3 and Comparative Examples 6 and 7 (which are replicates) illustrate the effect of colorant type in compositions using a pentaerythritol tetrastearate mold release agent. The dye-containing composition, Example 3, exhibits a large (48%) reduction in L*, improvement in gloss, improvement in modulus of elasticity, and improvement in impact strength compared to the carbon black-containing composition of Comparative Examples 6 and 7. Note that the L* values for HIPS-containing compositions are generally higher than those for homopolystyrene-containing compositions (e.g., Example 3 versus Example 1). However, the benefit of using a dye-based colorant rather than carbon black is retained. The L* advantage of homopolystyrene versus HIPS is also illustrated by Example 4, which has a blend of HIPS and homopolystyrene and exhibits a lower L* value than Example 3.

Comparative Example 8 is identical to Comparative Examples 6 and 7 except that the mold release agent is a polydimethylsiloxane rather than pentaerythritol tetrastearate. Note that the L* value for Comparative Example 8 is inferior to that for dye-containing Example 3.

Example 5 and Comparative Examples 9 and 10 (which are replicates) illustrate the effect of colorant type in compositions containing a linear low density polyethylene mold release agent. The dye-containing composition of Example 5 exhibits a lower L* value (about 49% lower).

Comparative Examples 11 and 12 illustrate two more carbon-black levels in a composition containing a homopolystyrene/HIPS blend and pentaerythritol tetrastearate as mold release agent. Even at the reduced carbon black level of 0.49 parts by weight in Comparative Example 12, the L* value is still substantially worse (higher) than the value for a corresponding dye-containing composition, Example 4.

TABLE 1

|  | Ex. 1 | C. Ex. 1 | C. Ex. 2 | C. Ex. 3 | Ex. 2 | C. Ex. 4 | C. Ex. 5 |
|---|---|---|---|---|---|---|---|
| COMPOSITIONS |  |  |  |  |  |  |  |
| PPE, 0.4 dL/g | 37 | 37 | 37 | 37 | 37 | 37 | 37 |
| TDP | 0.4 | 0.4 | 0.4 | 0.4 | 0.4 | 0.4 | 0.4 |
| PETS | 1 | 1 | 1 | 0 | 0 | 0 | 0 |
| LLDPE | 0 | 0 | 0 | 0 | 1 | 1 | 1 |
| PDMSO | 0 | 0 | 0 | 1 | 0 | 0 | 0 |
| HIPS | 0 | 0 | 0 | 0 | 0 | 0 | 0 |
| Homopolystyrene | 60.2 | 60.2 | 60.2 | 60.2 | 60.2 | 60.2 | 60.2 |
| Carbon black | 0 | 1.4 | 1.4 | 1.4 | 0 | 1.4 | 1.4 |
| Disperse Yellow 201 | 0.25 | 0 | 0 | 0 | 0.25 | 0 | 0 |
| Solvent Green 3 | 0.35 | 0 | 0 | 0 | 0.35 | 0 | 0 |
| Solvent Red 135 | 0.35 | 0 | 0 | 0 | 0.35 | 0 | 0 |
| Solvent Violet 13 | 0.45 | 0 | 0 | 0 | 0.45 | 0 | 0 |
| PROPERTIES |  |  |  |  |  |  |  |
| Pencil hardness |  |  |  |  |  |  |  |
| part 1 | H/H/H | H/H/H | H/H/H | H/H/H | H/H/H | H/H/H | H/H/H |
| part 2 | H/H/H | H/H/H | H/H/H | H/H/H | H/H/H | H/H/H | H/H/H |
| 60° Gloss | 104 | 99.9 | 99.0 | 98.8 | 102.5 | 94.6 | 98.8 |
| L* at 45° | 0.533 | 2.414 | 2.312 | 2.53 | 1.198 | 3.267 | 3.414 |
| L* at 45°, % improvement | 77.4 | — | — | — | 64.1 | — | — |
| HDT (° C.) | 117 | 120 | 124 | 128 | 121 | 124 | 126 |
| Impact strength (J/m) | 25 | 25 | 24 | 24 | 24 | 24 | 26 |
| Modulus of elasticity (MPa) | 3600 | 3500 | 3430 | 3360 | 3650 | 3400 | 3340 |

|  | Ex. 3 | C. Ex. 6 | C. Ex. 7 | Ex. 4 | C. Ex. 8 | Ex. 5 | C. Ex. 9 | C. Ex. 10 | C. Ex. 11 | C. Ex. 12 |
|---|---|---|---|---|---|---|---|---|---|---|
| COMPOSITIONS |  |  |  |  |  |  |  |  |  |  |
| PPE, 0.4 dL/g | 37 | 37 | 37 | 37 | 37 | 37 | 37 | 37 | 37 | 37 |
| TDP | 0.4 | 0.4 | 0.4 | 0.4 | 0.4 | 0.4 | 0.4 | 0.4 | 0.4 | 0.4 |
| PETS | 1 | 1 | 1 | 1 | 0 | 0 | 0 | 0 | 1 | 1 |
| LLDPE | 0 | 0 | 0 | 0 | 0 | 1 | 1 | 1 | 0 | 0 |
| PDMSO | 0 | 0 | 0 | 0 | 1 | 0 | 0 | 0 | 0 | 0 |
| HIPS | 60.2 | 60.2 | 60.2 | 25 | 60.2 | 60.2 | 60.2 | 60.2 | 24.63 | 24.39 |
| Homopolystyrene | 0 | 0 | 0 | 35.2 | 0 | 0 | 0 | 0 | 34.78 | 34.43 |
| Carbon black | 0 | 1.4 | 1.4 | 0 | 1.4 | 0 | 1.4 | 1.4 | 0.49 | 1.48 |
| Disperse Yellow 201 | 0.25 | 0 | 0 | 0.25 | 0 | 0.25 | 0 | 0 | 0 | 0 |
| Solvent Green 3 | 0.35 | 0 | 0 | 0.35 | 0 | 0.35 | 0 | 0 | 0 | 0 |
| Solvent Red 135 | 0.35 | 0 | 0 | 0.35 | 0 | 0.35 | 0 | 0 | 0 | 0 |
| Solvent Violet 13 | 0.45 | 0 | 0 | 0.45 | 0 | 0.45 | 0 | 0 | 0 | 0 |
| PROPERTIES |  |  |  |  |  |  |  |  |  |  |
| Pencil hardness |  |  |  |  |  |  |  |  |  |  |
| part 1 | F/F/F | HB/HB/HB | F/F/F | H/H/H | HB/HB/HB | HB/HB/HB | F/F/F | HB/HB/HB | — | — |
| part 2 | F/F/F | HB/HB/HB | F/F/F | H/H/F | HB/HB/HB | HB/HB/HB | F/F/F | HB/HB/F | — | — |
| 60° Gloss | 92.18 | 90.28 | 96.50 | 94.03 | 94.10 | 90.75 | 93.35 | 94.68 | — | — |
| L* at 45° | 2.468 | 5.387 | 4.170 | 1.595 | 6.764 | 2.627 | 5.322 | 5.065 | 4.82 | 6.20 |
| L* at 45°, % improvement | 48.4 | — | — | — | — | 49.4 | — | — | — | — |
| HDT (° C.) | 114 | 117 | 120 | 115 | 122 | 115 | 117 | 122 | — | — |
| Impact strength J/m) | 211 | 198 | 179 | 66 | 180 | 220 | 220 | 200 | — | — |
| Modulus of elasticity (MPa) | 2490 | 2460 | 2650 | 2970 | 2710 | 2460 | 2520 | 2540 | — | — |

EXAMPLES 6-10, COMPARATIVE EXAMPLES 13-20

These examples illustrate the effect of colorant type, polystyrene type, and mold release agent type in compositions comprising flame retardant.

In addition to the components listed for Examples 1-5, these compositions included a polytetrafluoroethylene encapsulated in styrene-acrylonitrile copolymer ("TSAN" in Table 2), and the flame retardant resorcinol bis(diphenyl phosphate), which was obtained as Fyrolflex RDP from Supresta ("RDP" in Table 2).

The compounding procedure of Example 1-5 was used, with the following exceptions: the liquid flame retardant was introduced to the blend through an upstream side feeder in the compounding step; the extruder temperature profile for zones from throat to die is 200-250-270-280-280-280° C.; the screw rotation rate is 300 rpm, a production rate of 23 kilograms/hour (50 pounds/hour), and a vent port vacuum of 20-25 centimeters (8-10 inches) of mercury; and the flame-retarded material is injection molded with barrel temperatures set to 260° C. at a speed of 5.08 centimeters/second (2 inches/second) at a 100 rpm rotation speed and holding pressure in the range of 5.5-6.9 megapascals (800-1000 pounds per square inch).

Compositions and properties are summarized in Table 2. The effect of colorant type in compositions containing homopolystyrene and pentaerythritol tetrastearate is evident in a comparison of dye-containing Example 6 and carbon black-containing Comparative Examples 13 and 14 (which are replicates). For Example 6, the L* value is (about 78%) lower and the 60° gloss value higher than those for Comparative Examples 13 and 14.

Comparative Example 15 is identical to Comparative Examples 13 and 14 except that a polydimethylsiloxane mold release agent was used instead of the pentaerythritol tetrastearate mold release agent. Compared to Example 6, Comparative Example 15 exhibits an inferior (higher) L* value and an inferior (lower) 60° gloss value.

The effect of colorant type in compositions containing homopolystyrene and a linear low density polyethylene mold release agent is evident in a comparison of dye-containing Example 7 and carbon black-containing Examples 16 and 17 (which are replicates). For Example 7, the L* value is (about 76%) lower and the 60° gloss value higher than those for Comparative Examples 16 and 17. Example 7 also exhibits improved impact strength.

The effect of colorant type in compositions containing HIPS and a linear low density polyethylene mold release agent is evident in a comparison of dye-containing Example 8 and carbon black-containing Example 18. For Example 8, the L* value is (about 47%) lower and the 60° gloss value higher than those for Comparative Example 18.

Comparative Example 19 is identical to Comparative Example 18 except that a polydimethylsiloxane mold release agent was used instead of the linear low density polyethylene mold release agent. Compared to Example 8, Comparative Example 19 exhibits an inferior (higher) L* value and an inferior (lower) 60° gloss value.

The effect of colorant type in compositions containing HIPS and pentaerythritol tetrastearate mold release agent is evident in a comparison of dye-containing Example 9 and carbon black-containing Example 20. For Example 9, the L* value is (about 41%) lower and the 60° gloss value higher than those for Comparative Example 20.

The L* advantage of homopolystyrene over HIPS is evident in a comparison of Example 6 (all homopolystyrene), Example 10 (homopolystyrene/HIPS blend), and Example 9 (all HIPS).

TABLE 2

|  | Ex. 6 | C. Ex. 13 | C. Ex. 14 | C. Ex. 15 | Ex. 7 | C. Ex. 16 | C. Ex. 17 |
|---|---|---|---|---|---|---|---|
| COMPOSITIONS |  |  |  |  |  |  |  |
| PPE, 0.4 dL/g | 43.96 | 43.96 | 43.96 | 43.96 | 43.96 | 43.96 | 43.96 |
| TDP | 0.4 | 0.4 | 0.4 | 0.4 | 0.4 | 0.4 | 0.4 |
| PETS | 1 | 1 | 1 | 0 | 0 | 0 | 0 |
| LLDPE | 0 | 0 | 0 | 0 | 1 | 1 | 1 |
| PDMSO | 0 | 0 | 0 | 1 | 0 | 0 | 0 |
| HIPS | 0 | 0 | 0 | 0 | 0 | 0 | 0 |
| Homopolystyrene | 38 | 38 | 38 | 38 | 38 | 38 | 38 |
| Carbon black | 0 | 1.4 | 1.4 | 1.4 | 0 | 1.4 | 1.4 |
| Disperse Yellow 201 | 0.25 | 0 | 0 | 0 | 0.25 | 0 | 0 |
| Solvent Green 3 | 0.35 | 0 | 0 | 0 | 0.35 | 0 | 0 |
| Solvent Red 135 | 0.35 | 0 | 0 | 0 | 0.35 | 0 | 0 |
| Solvent Violet 13 | 0.45 | 0 | 0 | 0 | 0.45 | 0 | 0 |
| TSAN | 0.24 | 0.24 | 0.24 | 0.24 | 0.24 | 0.24 | 0.24 |
| RDP | 15 | 15 | 15 | 15 | 15 | 15 | 15 |
| PROPERTIES |  |  |  |  |  |  |  |
| Pencil hardness |  |  |  |  |  |  |  |
| part 1 | H/H/H | H/H/H | 2H/2H/2H | H/H/H | H/H/H | H/H/H | H/H/H |
| part 2 | H/H/H | H/H/H | 2H/2H/2H | H/H/H | H/H/H | H/H/H | H/H/H |
| 60° Gloss | 101.4 | 99.4 | 98.6 | 99.2 | 100.0 | 99.2 | 97.6 |
| L* at 45° | 1.07 | 5.33 | 4.56 | 4.46 | 1.40 | 6.78 | 4.94 |
| L* at 45°, % improvement | 78.4 | — | — | — | 76.1 | — | — |
| HDT (° C.) | 86.6 | 93.1 | 91.4 | 95.6 | 89.6 | 96.0 | 94.5 |
| Impact strength (J/m) | 25.0 | 24.0 | 25.4 | 25.4 | 30.0 | 25.0 | 26.3 |
| Modulus of elasticity (MPa) | 3170 | 3220 | 3310 | 3290 | 3120 | 3140 | 3300 |

TABLE 2-continued

|  | Ex. 8 | C. Ex. 18 | C. Ex. 19 | Ex. 9 | C. Ex. 20 | Ex. 10 |
|---|---|---|---|---|---|---|
| COMPOSITIONS |  |  |  |  |  |  |
| PPE, 0.4 dL/g | 43.96 | 43.96 | 43.96 | 43.96 | 43.96 | 43.96 |
| TDP | 0.4 | 0.4 | 0.4 | 0.4 | 0.4 | 0.4 |
| PETS | 0 | 0 | 0 | 1 | 1 | 1 |
| LLDPE | 1 | 1 | 0 | 0 | 0 | 0 |
| PDMSO | 0 | 0 | 1 | 0 | 0 | 0 |
| HIPS | 38 | 38 | 38 | 38 | 38 | 25 |
| Homopolystyrene | 0 | 0 | 0 | 0 | 0 | 13 |
| Carbon black | 0 | 1.4 | 1.4 | 0 | 1.4 | 0 |
| Disperse Yellow 201 | 0.25 | 0 | 0 | 0.25 | 0 | 0.25 |
| Solvent Green 3 | 0.35 | 0 | 0 | 0.35 | 0 | 0.35 |
| Solvent Red 135 | 0.35 | 0 | 0 | 0.35 | 0 | 0.35 |
| Solvent Violet 13 | 0.45 | 0 | 0 | 0.45 | 0 | 0.45 |
| TSAN | 0.24 | 0.24 | 0.24 | 0.24 | 0.24 | 0.24 |
| RDP | 15 | 15 | 15 | 15 | 15 | 15 |
| PROPERTIES |  |  |  |  |  |  |
| Pencil hardness |  |  |  |  |  |  |
| part 1 | F/F/H | F/F/F | H/H/H | F/F/F | HB/HB/HB | H/H/H |
| part 2 | F/F/F | F/F/F | H/H/H | F/F/F | HB/HB/HB | H/H/H |
| 60° Gloss | 98.85 | 95.15 | 95.28 | 97.00 | 94.93 | 96.93 |
| L* at 45° | 3.378 | 6.397 | 5.748 | 2.562 | 4.347 | 1.858 |
| L* at 45°, % improvement | 47.2 | — | — | 41.1 | — | — |
| HDT (° C.) | 85.8 | 94.4 | 92.9 | 84.7 | 94.7 | 85.2 |
| Impact strength (J/m) | 200 | 206 | 114 | 150 | 188 | 70 |
| Modulus of elasticity (MPa) | 2490 | 2610 | 2800 | 2580 | 2670 | 2800 |

EXAMPLES 11-23, COMPARATIVE EXAMPLES 21-24

These examples illustrate the effects of colorant type on initial color and color stability. All compositions contained a blend of homopolystyrene and HIPS, as well as pentaerythritol tetrastearate as mold release agent. The orange dye Disperse Orange 47 was obtained as MACROLEX Orange R from Lanxess ("Disperse Orange 47" in Table 3). The blue dye Solvent Blue 104 was obtained as Sandoplast Blue 2B from Clariant ("Solvent Blue 104" in Table 3).

Compounding was conducted with a Prism co-rotating twin-screw extruder having a 24-millimeter screw diameter. The barrel set points for molding were 299° C. (570° F.), and the tool temperature was 88° C. (190° F.). Compositions are detailed in Table 3.

For color stability testing, molded color chips were exposed to the conditions of the SAE J1885 (Revised March 2005), "Accelerated Exposure of Automotive Interior Trim Components Using a Controlled Irradiance Water Cooled Xenon-Arc Apparatus". This test uses light from a xenon arc bulb as a method of simulating exposure to sunlight. Color stability testing was conducted on an ATLAS CI 5000 Sirius controlled irradiance apparatus. Samples were exposed to xenon arc radiation for a total of 600 hours, corresponding to a radiant exposure of 0.55 watts per square-meter measured at the central wavelength of 340 nanometers. The following light cycle settings were used: black panel temperature=89° C., chamber temperature=62° C., relative humidity=50%. The following dark cycle settings were used: chamber temperature=38° C., relative humidity=95%. The xenon lamp inner filter was quartz and the outer filter was type "S" borosilicate glass. The color stability of each composition was determined after 600 hours irradiation by calculating the CIELAB color difference parameter, ΔE. Color difference (ΔE) values were calculated according to the CIELAB color difference formula as follows:

$$\Delta E = [(\Delta L^*)^2 + (\Delta a^*)^2 + (\Delta b^*)^2]^{1/2}$$

wherein $$\Delta L^* = L_1^* - L_2^*$$

$$\Delta a^* = a_1^* - a_2^*$$

$$\Delta b^* = b_1^* - b_2^*$$

and wherein $L_1^*$, $a_1^*$, and $b_1^*$ are the lightness, red-green coordinate, and yellow-blue coordinate, respectively, prior to the exposure to the test, and $L_2^*$, $a_2^*$, and $b_2^*$ are lightness, red-green coordinate, and yellow-blue coordinate, respectively, after exposure to the test.

In Table 3, "L* at 45°" and "b* at 45°" refer to initial values (prior to light exposure).

In the first part of Table 3, a comparison of Comparative Example 21, which contains both dyes and carbon black, and Example 11, which contains dyes only, show that the dyes-only composition exhibits markedly superior initial darkness (much lower initial L* at 45°) and light stability (much lower ΔE at 600 hours). The superior light stability was totally unexpected, particularly in view of the prior art teaching that "[p]igments are more light stable than dyes and hence pigmented window films are substantially more light stable, than dyed window films". U.S. Pat. No. 6,833,184 B2 to Damnjanovic et al., column 3, lines 59-61. The initial color and color stability of the dyes-only Example 11 composition is also markedly superior in comparison to Comparative Example 22, which contains another mixture of dyes and carbon black, and Comparative Example 23, which contains carbon black alone.

Like Example 11, Examples 12-21 and 23 all contain only dyes as colorants and exhibit low initial L* values and low color shifts after 600 hours light exposure. The inventive and comparative examples in Table 3 collectively show that the presence of carbon black is associated with unacceptably high color shifts, while the use of dyes is associated with acceptably low color shifts. Example 23 shows that excellent initial color and color stability can be achieved at low dye loading levels.

Example 22, which contains only dyes as colorants but a relatively large amount of violet dye and no yellow dye, exhibits a low initial L* value but relatively high b* and ΔE values. This illustrates the preference for relatively equal amounts of dyes on opposing sides of the color wheel.

Comparative Example 24 contains only dyes as colorants, but the total dye amount is 0.3 weight percent (it also corresponds to removal of the yellow dye from Example 23). It exhibits a relatively high b* value and the sample actually appears dark blue. This illustrates the importance of having at least 0.4 weight percent total dye and further illustrates the preference for relatively equal amounts of dyes on opposing sides of the color wheel.

For all of these compositions, the poly(arylene ether) was a poly(2,6-dimethyl-1,4-phenylene ether) having an intrinsic viscosity of 0.33 deciliter per gram measured at 25° C. in chloroform, obtained as PPO 630 from GE Plastics. The impact modifier was a polystyrene-poly(ethylene-butylene)-polystyrene triblock copolymer having a polystyrene content of 33 weight percent, obtained as Kraton G1651 from Kraton Polymers.

Each of the dye-containing examples shows much lower L* and significantly higher gloss than the corresponding carbon black-containing comparative example that follows it.

The examples with and without block copolymer demonstrate that it is possible to balance the appearance, heat resistance, and impact resistance by the choice of the block copolymer type and amount, polystyrene type and amount, and the poly(arylene ether) molecular weight and amount.

TABLE 3

|  | C. Ex. 21 | C. Ex. 22 | C. Ex. 23 | Ex. 11 | Ex. 12 | Ex. 13 | Ex. 14 | Ex. 15 | Ex. 16 |
|---|---|---|---|---|---|---|---|---|---|
| COMPOSITIONS |  |  |  |  |  |  |  |  |  |
| PPE, 0.4 dL/g | 38.147 | 38.055 | 38.336 | 38.298 | 38.869 | 38.298 | 38.111 | 38.488 | 38.488 |
| TDP | 0.388 | 0.387 | 0.390 | 0.390 | 0.396 | 0.390 | 0.388 | 0.392 | 0.392 |
| PETS | 0.485 | 0.968 | 0.975 | 0.975 | 0.495 | 0.975 | 0.970 | 0.979 | 0.979 |
| HIPS | 24.267 | 24.208 | 24.387 | 24.363 | 24.726 | 24.363 | 24.243 | 24.483 | 24.483 |
| Homopolystyrene | 34.264 | 34.181 | 34.434 | 34.400 | 34.913 | 34.400 | 34.232 | 34.570 | 34.570 |
| Carbon black | 1.478 | 1.467 | 1.478 | 0 | 0 | 0 | 0 | 0 | 0 |
| Solvent Red 135 | 0.485 | 0.244 | 0 | 0.344 | 0.100 | 0.344 | 0.343 | 0.099 | 0.099 |
| Solvent Green 3 | 0.485 | 0.244 | 0 | 0.344 | 0.100 | 0.344 | 0.343 | 0.099 | 0.099 |
| Solvent Violet 13 | 0 | 0.244 | 0 | 0.344 | 0.100 | 0.098 | 0.343 | 0.099 | 0.346 |
| Disperse Yellow 201 | 0 | 0 | 0 | 0.344 | 0.100 | 0.098 | 0.343 | 0.099 | 0.346 |
| Disperse Orange 47 | 0 | 0 | 0 | 0.098 | 0.100 | 0.344 | 0.343 | 0.346 | 0.099 |
| Solvent Blue 104 | 0 | 0 | 0 | 0.098 | 0.100 | 0.344 | 0.343 | 0.346 | 0.099 |
| PROPERTIES |  |  |  |  |  |  |  |  |  |
| L* at 45° | 5.872 | 5.956 | 7.930 | 0.758 | 1.341 | 0.689 | 1.056 | 1.204 | 0.841 |
| b* at 45° | −1.264 | −1.786 | −1.824 | −0.255 | −0.431 | −0.074 | −0.480 | −0.479 | −0.281 |
| ΔE at 600 hours | 13.50 | — | 10.20 | 0.53 | — | 0.63 | N/A | 0.57 | 0.48 |

|  | Ex. 17 | Ex. 18 | Ex. 19 | Ex. 20 | Ex. 21 | Ex. 22 | Ex. 23 | C. Ex. 24 |
|---|---|---|---|---|---|---|---|---|
| COMPOSITIONS |  |  |  |  |  |  |  |  |
| PPE, 0.4 dL/g | 38.298 | 38.488 | 38.374 | 38.449 | 38.488 | 38.640 | 38.756 | 38.795 |
| TDP | 0.390 | 0.392 | 0.391 | 0.391 | 0.392 | 0.393 | 0.394 | 0.395 |
| PETS | 0.975 | 0.979 | 0.976 | 0.978 | 0.979 | 0.983 | 0.986 | 0.987 |
| HIPS | 24.363 | 24.483 | 24.411 | 24.459 | 24.483 | 24.580 | 24.654 | 24.678 |
| Homopolystyrene | 34.400 | 34.570 | 34.468 | 34.536 | 34.570 | 34.708 | 34.811 | 34.846 |
| Carbon black | 0 | 0 | 0 | 0 | 0 | 0 | 0 | 0 |
| Solvent Red 135 | 0.098 | 0.346 | 0.345 | 0.346 | 0.495 | 0.099 | 0.100 | 0.100 |
| Solvent Green 3 | 0.098 | 0.346 | 0.345 | 0.346 | 0.495 | 0.099 | 0.100 | 0.100 |
| Solvent Violet 13 | 0.344 | 0.099 | 0.345 | 0.494 | 0.099 | 0.497 | 0.100 | 0.100 |
| Disperse Yellow 201 | 0.344 | 0.099 | 0.345 | 0 | 0 | 0 | 0.100 | 0 |
| Disperse Orange 47 | 0.344 | 0.099 | 0 | 0 | 0 | 0 | 0 | 0 |
| Solvent Blue 104 | 0.344 | 0.099 | 0 | 0 | 0 | 0 | 0 | 0 |
| PROPERTIES |  |  |  |  |  |  |  |  |
| L* at 45° | 1.078 | 1.461 | 1.243 | 0.707 | 1.395 | 1.501 | 1.939 | 2.418 |
| b* at 45° | −0.359 | −0.778 | −0.764 | −2.127 | −1.594 | −5.990 | −1.269 | −6.296 |
| ΔE at 600 hours | 0.563 | 0.387 | 0.363 | 0.464 | 0.333 | 1.039 | — | — |

EXAMPLES 24-29, COMPARATIVE EXAMPLES 25-30

These examples illustrate various flame-retardant compositions varying in colorant type and amount, polystyrene type and amount, and presence or absence of a hydrogenated block copolymer of an alkenyl aromatic compound and a conjugated diene.

All of the foregoing working examples demonstrate that it is possible to formulate dye-containing compositions that show at least a 40% reduction in L* value compared to the carbon black-containing comparison, a 60° gloss of at least 90, a heat deflection temperature of at least 80° C., and a notched Izod impact strength of at least 20 Joules per meter.

TABLE 4

|  | Ex. 24 | C. Ex. 25 | Ex. 25 | C. Ex. 26 | Ex. 26 | C. Ex. 27 |
|---|---|---|---|---|---|---|
| COMPOSITIONS |  |  |  |  |  |  |
| PPE, 0.33 dL/g | 44.09 | 44.09 | 44.09 | 44.09 | 44.09 | 44.09 |
| TDP | 0.40 | 0.40 | 0.40 | 0.40 | 0.40 | 0.40 |
| TSAN | 0.24 | 0.24 | 0.24 | 0.24 | 0.24 | 0.24 |
| PETS | 0.70 | 0.70 | 0.70 | 0.70 | 0.70 | 0.70 |
| HIPS | 0 | 0 | 0 | 0 | 38.12 | 38.12 |
| Homopolystyrene | 38.12 | 38.12 | 36.12 | 36.12 | 0 | 0 |
| Carbon black | 0 | 1.4 | 0 | 1.4 | 0 | 1.4 |
| Disperse Yellow 201 | 0.25 | 0 | 0.25 | 0 | 0.25 | 0 |
| Solvent green 3 | 0.35 | 0 | 0.35 | 0 | 0.35 | 0 |
| Solvent red 135 | 0.35 | 0 | 0.35 | 0 | 0.35 | 0 |
| Solvent violet 13 | 0.45 | 0 | 0.45 | 0 | 0.45 | 0 |
| SEBS | 0 | 0 | 2.00 | 2.00 | 0 | 0 |
| RDP | 15.05 | 15.05 | 15.05 | 15.05 | 15.05 | 15.05 |
| PROPERTIES |  |  |  |  |  |  |
| 60° Gloss | 105 | 102 | 105 | 101 | 104 | 102 |
| L* at 45° | 0.668 | 8.217 | 0.983 | 7.389 | 1.424 | 6.870 |
| HDT (° C.) | 88.7 | 94.7 | 87.2 | 92.8 | 84.9 | 91.1 |
| Impact strength (J/m) | 24 | 18 | 28 | 29 | 95 | 113 |
| Modulus of elasticity (MPa) | 3560 | 3460 | 2870 | 3070 | 2440 | 2770 |

|  | Ex. 27 | C. Ex. 28 | Ex. 28 | C. Ex. 29 | Ex. 29 | C. Ex. 30 |
|---|---|---|---|---|---|---|
| COMPOSITIONS |  |  |  |  |  |  |
| PPE, 0.33 dL/g | 44.00 | 43.71 | 55.00 | 54.64 | 55.00 | 54.64 |
| TDP | 0.40 | 0.40 | 0.40 | 0.40 | 0.40 | 0.40 |
| TSAN | 0.24 | 0.24 | 0.24 | 0.24 | 0.24 | 0.24 |
| PETS | 0.70 | 0.70 | 0.70 | 0.70 | 0.70 | 0.70 |
| HIPS | 20.00 | 19.87 | 27.81 | 27.63 | 0 | 0 |
| Homopolystyrene | 18.81 | 18.69 | 0 | 0 | 25.31 | 25.14 |
| Carbon black | 0 | 1.4 | 0 | 1.4 | 0 | 1.4 |
| Disperse Yellow 201 | 0.20 | 0 | 0.20 | 0 | 0.20 | 0 |
| Solvent green 3 | 0.05 | 0 | 0.05 | 0 | 0.05 | 0 |
| Solvent red 135 | 0.30 | 0 | 0.30 | 0 | 0.30 | 0 |
| Solvent violet 13 | 0.20 | 0 | 0.20 | 0 | 0.20 | 0 |
| SEBS | 0 | 0 | 0 | 0 | 2.50 | 2.48 |
| RDP | 15.10 | 14.99 | 15.10 | 14.99 | 15.10 | 15.00 |
| PROPERTIES |  |  |  |  |  |  |
| 60° Gloss | 105 | 103 | 104 | 100 | 105 | 98.5 |
| L* at 45° | 1.797 | 7.704 | 2.040 | 6.031 | 2.594 | 6.857 |
| HDT (° C.) | 85.9 | 91.0 | 94.3 | 101.0 | 93.7 | 102.0 |
| Impact strength (J/m) | 54 | 43 | 88 | 75 | 36 | 32 |
| Modulus of elasticity (MPa) | 2680 | 2780 | 2540 | 2830 | 2770 | 2990 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A black-colored thermoplastic composition, comprising:
   a poly(arylene ether);
   a polystyrene; and at least two organic dyes; wherein the total concentration of the at least two organic dyes is at least 0.4 weight percent, based on the total weight of the thermoplastic composition;

wherein the composition exhibits
a 60° gloss value of at least 90 percent measured according to ASTM D523,
a CIELAB color shift, ΔE, less than or equal to 3 measured according to ASTM D2244 after 600 hours xenon arc exposure according to SAE J1885, and
a CIE lightness value, L*, less than or equal to 4 measured according to ASTM D2244 at an angle of 45° with the specular component of light excluded and using the CIE standard daylight illuminant D65,
wherein the CIE lightness value is at least 30 percent lower than a CIE lightness value of a corresponding composition in which an equal weight of carbon black has been substituted for the at least two organic dyes.

2. The black-colored thermoplastic composition of claim 1, exhibiting at least one of
a heat deflection temperature of at least 80° C. measured according to ASTM D648 at a load of 0.455 megapascals,
a notched Izod impact strength of at least 20 Joules per meter measured according to ASTM D256 at 23° C., and
a modulus of elasticity of at about 2400 to about 3700 megapascals measured according to ASTM D638 at 23° C.

3. The black-colored thermoplastic composition of claim 1, wherein the polystyrene is selected from the group consisting of homopolystyrene, rubber-modified polystyrene, and mixtures thereof.

4. The black-colored thermoplastic composition of claim 1, comprising about 20 to about 80 weight percent of the poly(arylene ether) and about 20 to about 80 weight percent of the polystyrene.

5. The black-colored thermoplastic composition of claim 1, wherein the at least two organic dyes are selected from the group consisting of anthraquinones, anthrapyridones, perylenes, anthracenes, perinones, indanthrones, quinacridones, xanthenes, thioxanthenes, oxazines, oxazolines, indigoids, thioindigoids, quinophthalones, naphthalimides, cyanines, methines, pyrazolones, lactones, coumarins, bisbenzoxazolylthiophenes, naphthalenetetracarboxylic acids, phthalocyanines, triarylmethanes, aminoketones, bis(styryl) biphenyls, azines, rhodamines, derivatives of the foregoing, and mixtures thereof.

6. The black-colored thermoplastic composition of claim 1, comprising at least three organic dyes.

7. The black-colored thermoplastic composition of claim 1, wherein the at least two organic dyes comprise at least one dye combination selected from the group consisting of a red dye and a green dye, a violet dye and a yellow dye, and an orange dye and a blue dye.

8. The black-colored thermoplastic composition of claim 7, wherein the at least two organic dyes comprise at least two of the dye combinations.

9. The black-colored thermoplastic composition of claim 1, wherein the at least two organic dyes comprise at least one dye combination selected from the group consisting of a solvent red dye and a solvent green dye, a solvent violet dye and a solvent yellow dye or disperse yellow dye, and a solvent orange dye and a solvent blue dye.

10. The black-colored thermoplastic composition of claim 9, wherein the at least two organic dyes comprise at least two of the dye combinations.

11. The black-colored thermoplastic composition of claim 1, wherein the composition comprises less than 0.1 weight percent of carbon black.

12. The black-colored thermoplastic composition of claim 1, wherein the composition is free of carbon black.

13. The black-colored thermoplastic composition of claim 1, further comprising a block copolymer of an alkenyl aromatic compound and a conjugated diene.

14. The black-colored thermoplastic composition of claim 1, further comprising a flame retardant.

15. The black-colored thermoplastic composition of claim 1, wherein the composition is free of inorganic filler.

16. The black-colored thermoplastic composition of claim 1, wherein the composition is free of polycarbonate.

17. The black-colored thermoplastic composition of claim 1, wherein the composition is free of any polymer having a refractive index less than 1.54 or greater than 1.62 measured according to ASTM D542 at 23° C.

18. The black-colored thermoplastic composition of claim 1, wherein the composition is free of any polymer other than the poly(arylene ether), the polystyrene, and a block copolymer of an alkenyl aromatic compound and a conjugated diene.

19. A black-colored thermoplastic composition, comprising:
about 30 to about 65 weight percent of a poly(2,6-dimethyl-1,4-phenylene ether) having an intrinsic viscosity of 0.35 to 0.5 deciliter per gram measured at 25° C. in chloroform;
about 15 to about 70 weight percent of a rubber-modified polystyrene; and
at least 0.4 weight percent total of at least four organic dyes, wherein the at least four organic dyes comprise a red dye, a green dye, a yellow dye, and a violet dye;
wherein all weight percents are based on the total weight of the thermoplastic composition; and
wherein the composition exhibits
a 60° gloss value of at least 94 percent, measured according to ASTM D523,
a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes,
a CIELAB color shift, ΔE, less than or equal to 2 measured according to ASTM D2244 after 600 hours xenon arc exposure according to SAE J1885,
a heat deflection temperature of at least 80° C. measured according to ASTM D648 at a load of 0.455 megapascals,
a notched Izod impact strength of at least 20 Joules per meter, measured according to ASTM D256 at 23° C., and
a modulus of elasticity of at about 2400 to about 3700 megapascals measured according to ASTM D638 at 23° C.

20. The black-colored thermoplastic composition of claim 19, further comprising about 25 to about 45 weight percent of a homopolystyrene.

21. The black-colored thermoplastic composition of claim 19, wherein the at least four organic dyes further comprise a blue dye and an orange dye.

22. The black-colored thermoplastic composition of claim 19, further comprising a flame retardant.

23. The black-colored thermoplastic composition of claim 19, wherein the composition exhibits a CIE b* value of about −2.2 to about 0.

24. The black-colored thermoplastic composition of claim 19, wherein the composition exhibits a pencil hardness of about HB to about 2H measured according to JIS K 56-5-4 at 23° C.

25. The black-colored thermoplastic composition of claim 19, wherein the composition exhibits
a 60° gloss value of 94 to 105 percent, measured according to ASTM D523,
a CIE lightness value, L*, of 0.5 to 2 measured according to ASTM D2244 at an angle of 45° with the specular component of light excluded and using the CIE standard daylight illuminant D65, wherein the CIE lightness value is 50 to 95 percent lower than a CIE lightness value of a corresponding composition in which an equal weight of carbon black has been substituted for the at least two organic dyes,
a CIELAB color shift, ΔE, of 0.3 to 3 measured according to ASTM D2244 after 600 hours xenon arc exposure according to SAE J1885,
a heat deflection temperature of 80 to 120° C. measured according to ASTM D648 at a load of 0.455 megapascals, and
a notched Izod impact strength of 20 to 220 Joules per meter, measured according to ASTM D256 at 23° C.

26. The black-colored thermoplastic composition of claim 19, wherein the composition exhibits at least one of
a flammability rating of V-0 measured according to the UL 94 Vertical Burning Test at a test sample thickness of 1.5 millimeters,
a glow wire ignition temperature (GWIT) of about 700 to about 750° C. measured according to UL 746A at a test sample thickness of 1.0 millimeter,
a glow wire ignition temperature (GWIT) of about 725 to about 775° C. measured according to UL 746A at a test sample thickness of 3.0 millimeters, and
a glow wire flammability index (GWFI) of about 930 to about 990° C. measured according to UL 746A at a test sample thickness of 1.0 millimeter.

27. A black-colored thermoplastic composition, comprising:
about 40 to about 70 weight percent of a poly(2,6-dimethyl-1,4-phenylene ether) having an intrinsic viscosity of 0.28 to 0.38 deciliter per gram measured at 25° C. in chloroform;
about 15 to about 45 weight percent of a rubber-modified polystyrene; and
at least 0.4 weight percent of at least four organic dyes, wherein the at least four organic dyes comprise a red dye, a green dye, a yellow dye, and a violet dye;
wherein all weight percents are based on the total weight of the thermoplastic composition; and
wherein the composition exhibits
a 60° gloss value of at least 94 percent measured according to ASTM D523,
a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes,
a CIELAB color shift, ΔE, less than or equal to 3 measured according to ASTM D2244 after 600 hours xenon arc exposure according to SAE J1885,
a heat deflection temperature of at least 80° C. measured according to ASTM D648 at a load of 0.455 megapascals,
a notched Izod impact strength of at least 20 Joules per meter measured according to ASTM D256 at 23° C., and
a modulus of elasticity of about 2400 to about 3700 megapascals measured according to ASTM D638 at 23° C.

28. The black-colored thermoplastic composition of claim 27, wherein the at least four organic dyes further comprise a blue dye and an orange dye.

29. The black-colored thermoplastic composition of claim 27, further comprising about 10 to about 30 weight percent of a homopolystyrene.

30. The black-colored thermoplastic composition of claim 27, further comprising a flame retardant.

31. The black-colored thermoplastic composition of claim 27, wherein the composition exhibits a CIE b* value of about −2.2 to about 0.

32. The black-colored thermoplastic composition of claim 27, wherein the composition exhibits a pencil hardness of about HB to about 2H measured according to JIS K 56-5-4 at 23° C.

33. The black-colored thermoplastic composition of claim 27, wherein the composition exhibits
a 60° gloss value of 94 to 105 percent, measured according to ASTM D523,
a CIE lightness value, L*, of 0.5 to 2 measured according to ASTM D2244 at an angle of 45° with the specular component of light excluded and using the CIE standard daylight illuminant D65, wherein the CIE lightness value is 50 to 95 percent lower than a CIE lightness value of a corresponding composition in which an equal weight of carbon black has been substituted for the at least two organic dyes,
a CIELAB color shift, ΔE, of 0.3 to 3 measured according to ASTM D2244 after 600 hours xenon arc exposure according to SAE J1885,
a heat deflection temperature of 80 to 100° C. measured according to ASTM D648 at a load of 0.455 megapascals, and
a notched Izod impact strength of 20 to 100 Joules per meter, measured according to ASTM D256 at 23° C.

34. The black-colored thermoplastic composition of claim 27, wherein the composition exhibits at least one of
a flammability rating of V-0 measured according to the UL 94 Vertical Burning Test at a test sample thickness of 1.5 millimeters,
a glow wire ignition temperature (GWIT) of about 700 to about 750° C. measured according to UL 746A at a test sample thickness of 1.0 millimeter,
a glow wire ignition temperature (GWIT) of about 725 to about 775° C. measured according to UL 746A at a test sample thickness of 3.0 millimeters, and
a glow wire flammability index (GWFI) of about 930 to about 990° C. measured according to UL 746A at a test sample thickness of 1.0 millimeter.

35. A method of preparing a black-colored thermoplastic composition, comprising:
melt-kneading a composition comprising
a poly(arylene ether),
a polystyrene, and
at least two organic dyes to form a black-colored thermoplastic composition;
wherein the total concentration of the at least two organic dyes is at least 0.4 weight percent, based on the total weight of the black-colored thermoplastic composition; and
wherein the black-colored thermoplastic composition exhibits
a 60° gloss value of at least 90 percent, measured according to ASTM D523,
a CIELAB color shift, ΔE, less than or equal to 3 measured according to ASTM D2244 after 600 hours xenon arc exposure according to SAE J1885, and
a CIE lightness value, L*, less than or equal to 4 measured according to ASTM D2244 at an angle of 45° with the specular component of light excluded and using the CIE standard daylight illuminant D65,
wherein the CIE lightness value is at least 30 percent lower than a CIE lightness value of a corresponding composition in which an equal weight of carbon black has been substituted for the at least two organic dyes.

36. A method of preparing a black-colored thermoplastic composition, comprising:
melt-kneading a composition comprising
about 30 to about 50 weight percent of a poly(2,6-dimethyl-1,4-phenylene ether) having an intrinsic viscosity of 0.35 to 0.5 deciliter per gram measured at 25° C. in chloroform,
about 15 to about 70 weight percent of a rubber-modified polystyrene, and
at least 0.4 weight percent total of at least four organic dyes, wherein the at least four organic dyes comprise a red dye, a green dye, a yellow dye, and a violet dye
to form a black-colored thermoplastic composition;
wherein all weight percents are based on the total weight of the black-colored thermoplastic composition; and
wherein the black-colored thermoplastic composition exhibits a 60° gloss value of at least 94 percent measured according to ASTM D523,
a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes,
a CIELAB color shift, ΔE, less than or equal to 3 measured according to ASTM D2244 after 600 hours xenon arc exposure according to SAE J1885,
a heat deflection temperature of at least 80° C. measured according to ASTM D648 at a load of 0.455 megapascals,
a notched Izod impact strength of at least 20 Joules per meter, measured according to ASTM D256 at 23° C., and
a modulus of elasticity of about 2400 to about 3700 megapascalsm megapascals measured according to ASTM D638 at 23° C.

37. A method of preparing a black-colored thermoplastic composition, comprising:
melt-kneading a composition comprising
about 40 to about 60 weight percent of a poly(2,6-dimethyl-1,4-phenylene ether) having an intrinsic viscosity of 0.28 to 0.38 deciliter per gram measured at 25° C. in chloroform,
about 15 to about 45 weight percent of a rubber-modified polystyrene, and
at least 0.4 weight percent of at least four organic dyes, wherein the at least four organic dyes comprise a red dye, a green dye, a yellow dye, and a violet dye
to form a black-colored thermoplastic composition;
wherein all weight percents are based on the total weight of the black-colored thermoplastic composition; and
wherein the black-colored thermoplastic composition exhibits
a 60° gloss value of at least 94 percent measured according to ASTM D523,
a CIE lightness value, L*, less than or equal to 2 measured according to ASTM D2244 at an angle of 45° with the specular component of light excluded and using the CIE standard daylight illuminant D65, wherein the CIE lightness value is at least 50 percent lower than a CIE lightness value of a corresponding composition in which an equal weight of carbon black has been substituted for the at least two organic dyes,
a CIELAB color shift, ΔE, less than or equal to 3 measured according to ASTM D2244 after 600 hours xenon arc exposure according to SAE J1885,
a heat deflection temperature of at least 80° C. measured according to ASTM D648 at a load of 0.455 megapascals,
a notched Izod impact strength of at least 20 Joules per meter measured according to ASTM D256 at 23° C., and
a modulus of elasticity of about 2400 to about 3700 megapascals measured according to ASTM D638 at 23° C.

38. An article comprising the composition of claim 1.
39. An article comprising the composition of claim 19.
40. An article comprising the composition of claim 27.

* * * * *